United States Patent [19]

Mangiavacchi

[11] 4,221,119
[45] Sep. 9, 1980

[54] CARDAN JOINT OF THE BLOCK BEARING TYPE

[75] Inventor: Jacques Mangiavacchi, Chatou, France

[73] Assignee: Glaenzer Spicer, Poissy, France

[21] Appl. No.: 7,957

[22] Filed: Jan. 31, 1979

[30] Foreign Application Priority Data

Feb. 16, 1978 [FR] France .................................. 78 04384

[51] Int. Cl.³ ............................ F16D 3/26; F16D 3/33
[52] U.S. Cl. .................................... 64/17 R; 64/17 A
[58] Field of Search ............................. 64/17 A, 17 R

[56] References Cited
U.S. PATENT DOCUMENTS

| | | | |
|---|---|---|---|
| 2,698,527 | 1/1955 | Anderson | 64/17 A |
| 3,159,013 | 12/1964 | Mazziotti | 64/17 R |
| 4,166,366 | 9/1979 | Okuda et al. | 64/17 R |
| 4,167,859 | 9/1979 | Okuda | 64/17 R |
| 4,179,905 | 12/1979 | Schultenkämper | 64/17 A |

*Primary Examiner*—Henry K. Artis
*Attorney, Agent, or Firm*—Diller, Ramik & Wight

[57] ABSTRACT

Block bearings designed to equip the trunnions of the spider of the joint are provided for fixing by lugs to a flange of the joint mounted on a shaft to be coupled. They include drive tenons clampable in a corresponding groove formed in the contacting surface of the flange, as well as centering end pieces situated at the base of said tenons, towards the inside of the cardan joint. The improved joint finds application in transmissions through block bearings, in heavy vehicles.

10 Claims, 14 Drawing Figures

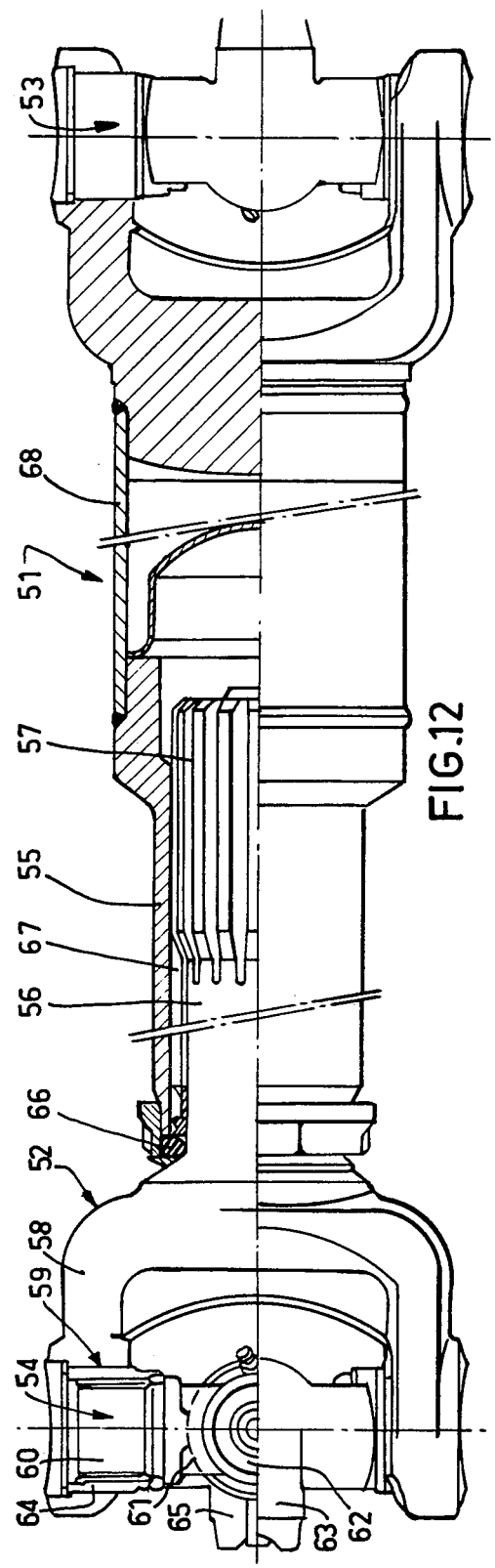
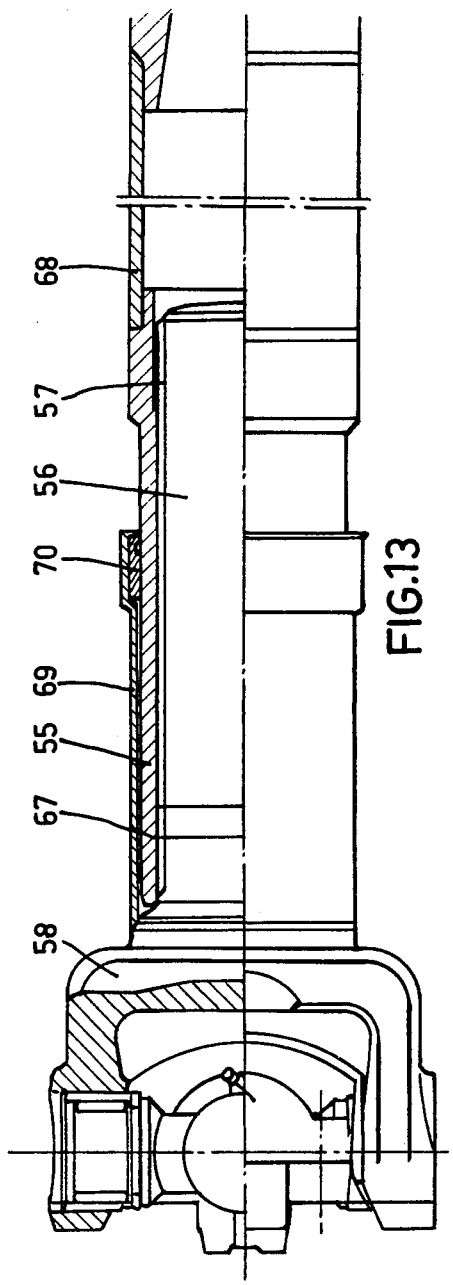
FIG.12
FIG.13

CARDAN JOINT OF THE BLOCK BEARING TYPE

FIELD OF THE INVENTION

The present invention relates to an improved cardan joint of the block bearing type.

DESCRIPTION OF THE PRIOR ART

Cardan joints for the end-to-end coupling of two rotary shafts conventionally include two jaws or forks fixed respectively to each of two shafts and a spider serving to transmit the rotary torque between said jaws, the spider being pivoted on the latter through two pairs of coaxial trunnions, the trunnions of the same pair being able to oscillate in two aligned bearings associated with the same jaw or fork.

In joints of simple design, said bearings are integral parts of the jaws or forks and are machined in the arms of the latter. On the other hand, in more sophisticated joints of the "block bearing" type, such as that which is the subject of French Pat. No. 756,038, the jaws are formed from three assembled parts, each jaw being then composed of a flange designed to be fixed to one of the shafts to be coupled and of two bearings, notably needle bearings, each provided with a sole or "block" for fixing by screws to the flange, with a tenon projecting on this surface of the sole and provided to transmit the torque by "keying" to said flange and with a centering bearing surface, formed by a portion of a cylindrical surface situated substantially at the outer peripheral portion of the bearing. The radial positioning of each bearing is ensured by the cooperation of its seating with a corresponding centering means of the flange which is generally constituted by a peripheral end piece projecting on the support surface of the latter, this end piece being bored to the diameter of said centering bearing surface so as to envelope them and to thus hold the block bearings radially, whilst ensuring their centering.

Now, the fact of centering the block bearings through the outside so as to grip the peripheral portion of the latter to hold them radially results in numerous drawbacks, such as increased bulk of the joint, dependence on the hand between the quality of centering of the block bearing and the width of its tenon serving to transmit the torque, and on the other hand, between the axial bulk of the block bearing and its breakage strength, a poor distribution of the support surfaces of the blocks on the flange around their fixing holes with the result of generating a troublesome tendency to tilting of the block bearing under the clamping forces and, moreover, difficulties of machining the support surface of the flange whose peripheral centering end piece prevents broaching and imposes in practice turning as a machining technique with the faults in flatness inherent in the latter, such as a slight conicity which causes poor alignment of the block bearings, and, consequently, their premature wear.

It is known, also, notably from French Pat. Nos. 690,313 and 866,450, to hold the block bearings radially with respect to the flange by means of projecting shoulders at the base of the support surface of the sole of said block bearings but these shoulders present at their periphery a retaining surface which is flat and, consequently, does not permit accurate centering on the flange. In addition, the flatness of said surface considerably complicates the operations of machining the block bearings.

The problem which the present invention is designed to overcome therefore consists, on the one hand, of ensuring a centering envelopping the block bearings by the flange so as to retain them radially, and to center them accurately, and this without increasing the radial bulk of the joint beyond that of said block bearing, and on the other hand, of dissociating the various parameters of quality of centering, of width of drive tenon, of axial bulk and of breakage strength of the block bearing, whilst achieving better distribution of the support surface around the fixing holes and improving the flatness of the surfaces in contact.

It is hence essentially an object of the invention to provide a cardan joint including improved block bearings and transmission flanges which enable the drawbacks of conventional joints to be avoided whilst being easy and economical to manufacture.

GENERAL DESCRIPTION OF THE INVENTION

The cardan joint of the block bearing type according to the invention, for the end-to-end coupling of two rotary shafts, comprises two flanges provided for fastening to said shafts, two pairs of block bearings fixed to the flanges by suitable fixing means and a spider for the transmission of the torque, the trunnions of the latter being oscillatingly mounted in the block bearings whose block each include a drive tenon engageable in a corresponding recess of the associated flange and a centering bearing surface engageable at least partially in a centering bearing surface of complementary shape of said flange, so as to center the block bearings and prevent them from separating from the axis of the joint, the centering surface of the block being constituted by the peripheral surface of an end piece provided at the base of the latter and at a distance from the center of the spider less than that of the fixing means of said block on the flanges, the peripheral surfaces of the end pieces and the centering bearing surfaces of the flanges being surfaces of revolution having for axes those of the rotary shafts and the radial distance between the drive tenons and the axes of the shafts being greater than that comprised between the same axes and said surfaces.

The fact of bringing, according to the invention, the centering of the block bearings towards the axis of the cardan joint enables said centering to be ensured in the middle zone of the block, in line with the tenon, and to thus dissociate the quality of centering from the width of this tenon, the invention enabling, in addition, reduction of the bulk both axially and radially of the joint and facile and improved machining of the support surfaces of the flanges due to the elimination of any projecting portion on the latter.

BRIEF DESCRIPTION OF THE DRAWINGS

The invention will now be described in more detail with reference to particular embodiments given by way of non-limiting examples and shown in the accompanying drawings in which:

FIG. 12 shows a complete transmission having cardan joints at its ends;

FIG. 13 shows a modification of the transmission of FIG. 12; and

DESCRIPTION OF PREFERRED EMBODIMENTS

Figure 1:
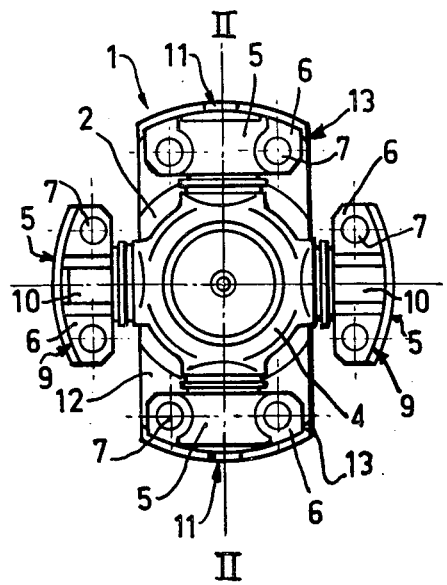
FIGS. 1 and 2 show in front and lateral elevations a conventional cardan joint of the externally centered block bearing type.

A conventional joint 1 of the block bearing type (FIGS. 1 and 2) includes two flanges 2 and 3 oriented perpendicularly and designed to be mounted at the end of two shafts to be coupled, (not shown) (the front flange 3 having been withdrawn from FIG. 1 to simplify the drawing), as well as a spider 4 whose trunnions are oscillatingly mounted in the block bearing 5, preferentially needle bearings, provided with support soles or block 6 provided with fixing holes 7 for the passage of connecting screws 8 to the flanges. Each sole 6 of the block bearing 5 includes an external centering bearing surface 9 and a drive tenon 10 engageable in a radial groove 11 formed in the corresponding support surface 12 of the flange to which the block bearing is fixed. It will be noted that the centering bearing surface 9 of each block 6 is engaged under an end piece 13 positioned at the periphery of the support surface 12 of the corresponding flange, this end piece covering said centering bearing 9 so as to, on the one hand, position the block bearing with respect to the axis, and on the other hand, to retain it radially against centrifugal ejecting forces.

It is to be noted that the centering end piece 13 of each flange extends beyond the radial bulk of the two opposite aligned end bearings and that it extends in projection with respect to the support surfaces 12 of the flanges.

Figure 3:
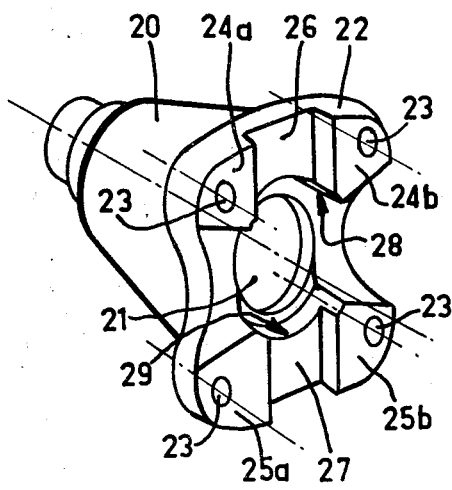
FIG. 3 shows a flange of an embodiment of an improved cardan joint according to the invention.
Figure 4:
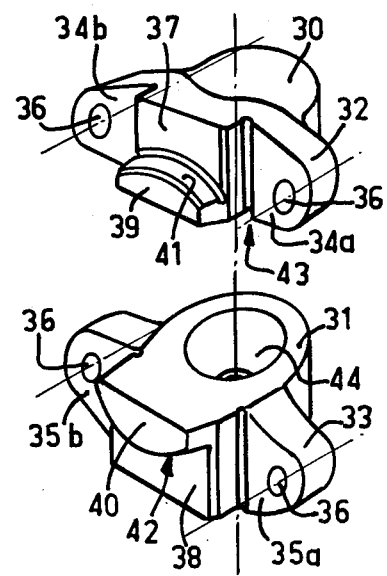
FIG. 4 shows the two improved block bearings associated with the flange of the embodiment of FIG. 3.

As shown in FIG. 3, the improved flange of the joint according to the invention includes, of course, a body 20 traversed by an opening bore 21 designed to receive a shaft end to be coupled (not shown) as well as a flange 22 provided with four fixing holes 23 distributed regularly around the axis of th flange on the flat support surface of the latter, said surface being divided into four segments 24a, 24b and 25a, 25b associated in pairs, each pair of segments being designed to serve as support for the block of a block bearing and the two segments of a same pair 24a, 24b or 25a, 25b being separated by a groove respectively 26 or 27 designed to receive the corresponding drive tenon of the associated block bearing. The four support segments 24a, 24b or 25a, 25b are counterbored internally so as to form a centering housing hollowed with respect to the support surface of the flange, this housing being limited by two opposite cylindrical portions 28 and 29 situated in alignment with the grooves 26 and 27 at the inner part of the latter, that is to say closest to the axis of the joint. The two block bearings 30 and 31 with blocks 32 and 33 associated with the previously described flange and shown in FIG. 3 include, on the support surfaces 34a and b and 35a and b (FIG. 4) designed to come respectively into contact with the surfaces 24a, b and 25a, b of said flange, fixing holes 36 for the passage of screws (not shown), said support surfaces 34a, 34b and 35a, 35b being separated respectively by projecting tenons 37 and 38 enclosable in corresponding grooves 26 and 27 of the flange for the transmission of the rotary torque. Each block bearing 30, 31 includes, in addition, at the base of each tenon 37, 38 situated closest to the axis of the joint, an end piece 39, 40 of which the peripheral cylindrical surface 41, 42 constitutes a centering bearing surface of the corresponding block bearing, said centering bearing surfaces 41 and 42 being designed to be housed in the counterbore of the flange of FIG. 3, in contact respectively with the opposite cylindrical portions 28, 29 of said counterbore. Of course, each block bearing includes also a bore 43 and 44 designed, when lined with needles, to receive the trunnions of the spider ensuring the transmission of the torque between the flanges of the joint.

It will be noted that the centering bearing surfaces 41 and 42 of the block bearings 30 and 31 extend over the whole width of the respective tenons 37, 38, which they can overlap laterally and it will be noted especially that said centering bearing surfaces ensure the centering principally at the base of said tenons and not only on each side of the latter.

Figure 5:
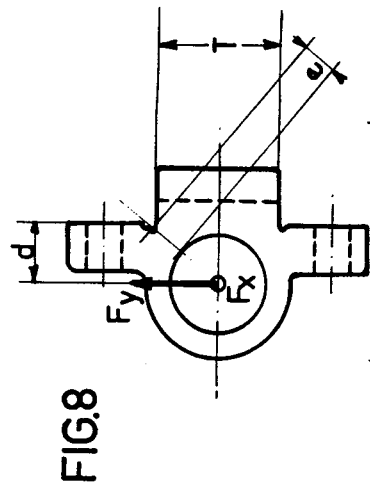
FIGS. 5, 6 and 7 show respectively top views, rear views and lateral views of a conventional block bearing.
Figure 6:
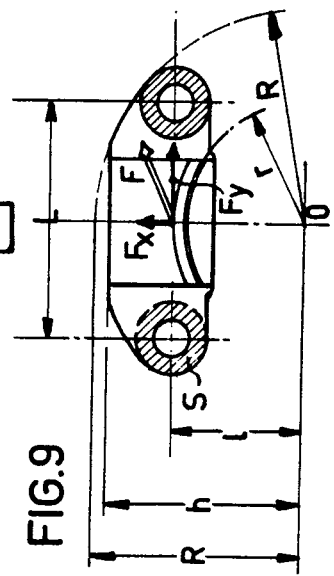
Figure 7:
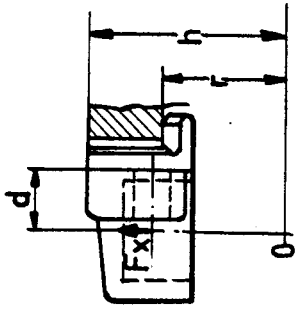
Figure 8:
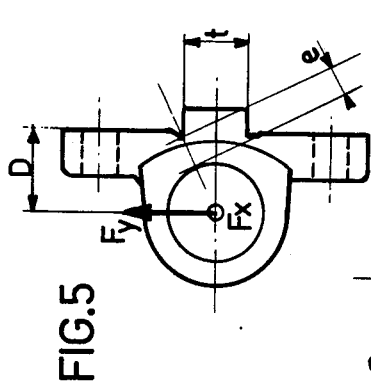
FIGS. 8, 9 and 10 show respectively the same views of an embodiment of a block bearing according to the invention including a cylindrical centering bearing surface.
Figure 9:
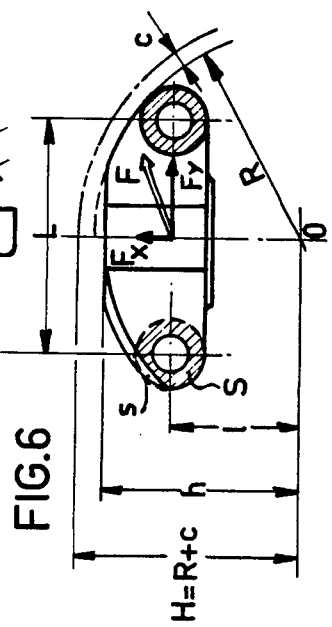
Figure 10:
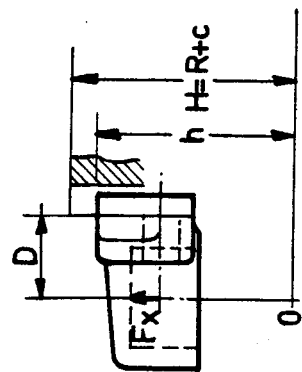

To show more clearly the advance achieved by the invention, as well as the advantages which flow therefrom, a detailed comparison of a conventional block bearing with respect to an improved block bearing according to the invention is necessary, the prior art being illustrated in FIGS. 5, 6 and 7 situated to the left of the sheet, whilst the novel design is shown in FIGS. 8, 9 and 10 situated to the right to correspond with the preceding ones.

Figure 2:
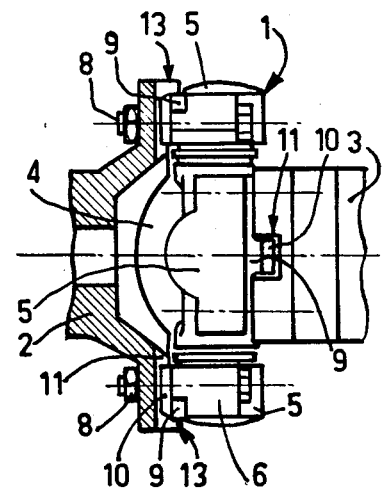

Referring to FIGS. 1 and 2, it is observed that, notably for reasons of machining, the grooves 11 formed in the support surfaces of the flanges, open at their two ends, in other words the centering end pieces 13 are interrupted in line with said grooves 11, which eliminates therefore any external centering in a zone where the latter appears to be most necessary. Consequently, in order not to penalize this function too much and to ensure nonetheless a sufficient centering, the width of the grooves 11 is generally limited to a certain maximum t (FIG. 5). Now in order that the block bearing may preserve sufficient breaking strength, notably at the level of the minimum cross-section of the bearing of the side of the block, a certain minimum thickness e must imperatively be preserved. Taking into account these two values t and e imposed in practice, it is observed that in conventional block bearings (FIG. 5) the minimum distance D from the axis of the bearing to the support surface of the block is relatively large in comparison with the diameter of the bore of the block bearing.

On the other hand, in the improved block bearings according to the invention, due to the fact of the centering and their radial retention of the latter effected not only at their periphery, but on the contrary towards the inside, at the base of the drive tenons (FIG. 4), the centering bearing surfaces are not interrupted in line with the grooves formed in the support surfaces of the flanges and, consequently, the width of the drive tenons is totally independent of said centering bearing surfaces of which reciprocally the quality of centering is not at all effected by the size of said tenons.

Consequently, due to the fact that the width T of the tenons (FIG. 8) can be increased considerably, it is possible to reduce to d the distance of the support surface of the block to the axis of the block bearing, whilst preserving the minimum thickness e mentioned above. There results therefrom the possibility of considerable reduction in the longitudinal bulk of the block bearing and, in addition, for the same forces of transverse drive Fy and radial drive Fx transmitted by the trunnions of the star-member, the tilting torques Fy x d and Fx x d (FIGS. 8 and 9) supported by the improved block bearing are less than those Fy x D and Fx x D (FIGS. 5 and 7) included in a conventional block bearing, which is manifested by traction forces which are also less on the fastening screws. FIGS. 6 and 9 show the gain in space achieved due to the invention. In fact, for block bearings of the same height including blocks whose fastening holes have the same separation L and are situated at the same distance 1 from the longitudinal middle plane of the flange, it is observed that with an external centering of radius R envelopped by an end piece of thickness c of the flange, the space occupied by the rotary joint is a cylinder of radius $H = R + c$.

On the other hand, with internal centering of radius r (FIG. 9), the block bearing having an external diameter R identical with that of the conventional block bearing, the space swept during the rotation of the joint is a cylinder of radius R less therefore than H. If it is desired to obtain the same result with a conventional block bearing, it would be necessary to incorporate the thickness c of the end piece of the flange in the radial volume of the block bearing, which would come back to amputating the support surfaces shown by hatched lines S around the fastening holes (compare left portion of FIG. 6) by a segment s and, due to the fact of the unequal distribution of the support zones around the holes, the block bearing would have a tendency to tilt.

Finally, due to the fact that the centering end piece of the flanges is eliminated on the joints according to the invention and at the support surfaces 24a, b and 25a, b of the latter do not include any projecting portion, the machining of said surfaces can be effected otherwise than by turning, for example by broaching or surfacing, which enables defects in flatness to be avoided, such as slight conicity or sphericity resulting in misalignment or deformation of the block bearings and their rapid deterioration, or at least premature wear.

It is to be noted that the centering bearing surfaces of the blocks situated at the base of the tenons can largely overlap on both sides of the latter so as to increase all the more the extent of the contact surfaces between said blocks and the flanges.

Figure 11:
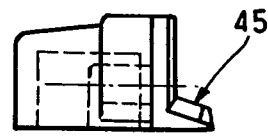
FIG. 11 shows a block bearing similar to that of FIG. 10 but including a conical centering bearing surface.

In the same way, it was naturally arranged to produce easily machinable cylindrical centering bearing surfaces but of course said bearing surfaces can also be conical as is shown in FIG. 11 by reference numeral 45.

FIGS. 12 and 13 show by way of non-limiting examples, two possible constructions of cardan transmissions equipped with block bearings according to the invention.

The transmission shown in FIG. 12 is principally composed of the transmission portion 51 and the transmission portion 52 whose ends include respectively a cardan joint 53 and 54. The connecting shaft is composed for the transmission portion 51 of a tube 55 and for the transmission portion 52 of a solid shaft 56 mounted in the tube and sliding with respect to it. The torque is transmitted, for example, by grooves 57. In the example illustrated, they are grooves with straight sides. The cardan joints 53 and 54 have, in this Figure, the same construction so that the description can be limited to the cardan joint 54. The cardan joint 54 has a jaw 58 connected to the shaft 56. The jaw 58 has bores 59, in which the trunnions 60 of a spider 61 become housed, mounted in the bushings 64. The two other trunnions 62 are provided with block bearings 63 which can be mounted by means of screws on the output flange not shown here. A tenon 55 prevents lateral movement and participates thus in the transmission of the torque; it is housed in a groove of the output flange.

Sliding between the transmission portions 51 and 52 with respect to one another is effected by means of the grooves 57, which form part of the solid shaft 56. The length of sliding depends in this embodiment on the length of the grooves 67 of the tube 55. To create favorable friction conditions the grooves of the solid shaft 56 or the grooves 67 of the tube 55 may be provided with a coating, of plastics for example. To protect the grooves 57 against dirt, a seal 66 has been provided. The tube-shaped part 55 which has hollow grooves 67 is provided at one of its ends with a seat serving as a mounting for a tube 68. This tube 68 is formed with a length corresponding to the total length of the cardan transmission and it is welded between the jaw of the cardan joint 53 and the grooves of the tube 55.

The FIG. 13 illustrates another embodiment of a cardan transmission, in which the embodiment corresponds in its principle with that of FIG. 12 with the difference that the length of sliding is determined by the solid shaft 56 and not by the grooves 67 of the tube 55. The grooves are of developing shape, those of the tube being preferably coated. Moreover, the solid shaft 56 possesses on the jaw 58 a tube 69 which carries the seal 70. The tube 68 is, in this version also, provided to determine the total length, so that by the differences only in length of the tube 68 it is possible to produce a transmission of variable length.

Figure 14:
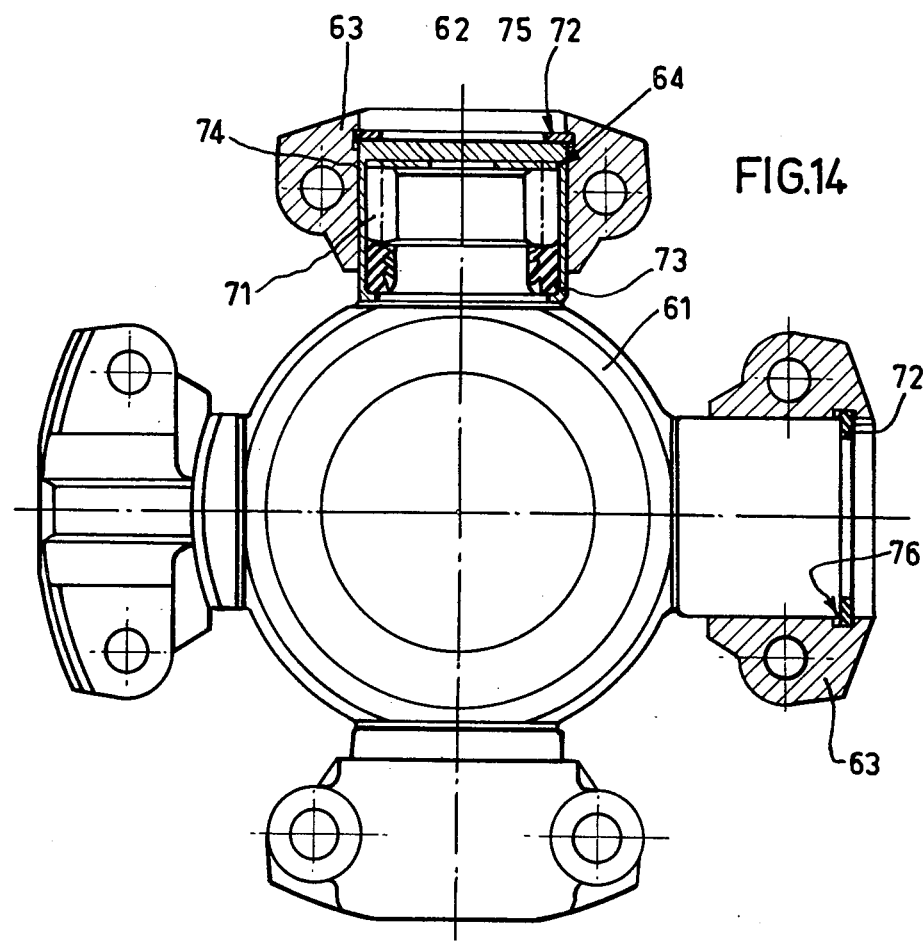
FIG. 14 shows in partial section a cardan joint equipping one of the transmissions of FIGS. 12 and 13.

The trunnions 62 of the spider 61 illustrated in FIG. 14 are introduced into the bushings 64 after the interposition of bearing members 71. The bearing members 71 run on the one hand on the trunnions 62 and on the other hand in the bearing bushings 64 housed in the bores of the block bearings 63 where they are held in position by a circlip 72.

The seal between the bushings 64 and the spider 61 is produced by a sealing ring 73. For adjusting play, it is provided that the bushings 64 with thin walls, whose thickness of bottom 75 is greater than that of the lateral wall 74 are positioned and centered by circlips 72 which have different thicknesses. The circlips 72 are housed in grooves 76 formed in the bore of the block bearings 63 and whose width is at least as great as that of the maximum thickness of the circlips 72. Thus the mounting of the block bearings is easy and due to the use of circlips 72 the spider 61 can be perfectly centered.

With the use of circlips of different thicknesses, very accurate adjustment of the clearances is possible with very fine graduation of the circlips 72. It is possible to compensate very accurately for possible tolerances in manufacture of the block bearings 63 as well as their centering, so that the balancing of the transmission is possible even with unfavorable tolerances. Due to the interposition of the bearing bushings 64 the block bearings 63 are not subject to any wear coming from the members 71.

The principal field of application can be envisaged in the sector of heavy vehicles where constructions of this type are applied preferentially by reason of the small bulk available.

Of course, the scope of the invention is not limited to the embodiments described above by way of nonlimited examples, but it extends also to any modification differing only in detail.

I claim:

1. Cardan joint of the block bearing type for the end-to-end coupling of two rotary shafts, said joint comprising two flanges provided for mounting on said shafts, two pairs of block bearings fixed to the flanges by suitable fixing means and a spider for the transmission of the torque between the latter, the trunnions of the spider being mounted to oscillate in the block bearings, drive tenons included in the blocks and clampable in a corresponding recess of the associated flange, a centering bearing surface engageable at least partially in a seating bearing surface of complementary shape of said flange so as to center the bearings and prevent them from moving away from the axis of the joint, the centering bearing surface of the blocks being constituted by the peripheral surface of an end piece provided at the base of the latter and at a distance from the center of the spider less than that of the means of fixing said blocks to the flanges, said peripheral surfaces of the end pieces and the centering bearing surfaces of the flanges being surfaces of revolution having as axes those of the coupled rotary shafts and the radial distance between the drive tenons and the axes of the shafts being greater than that comprised between these same axes and said surface.

2. Joint according to claim 1, wherein the centering bearing surfaces of the blocks are situated in line with the tenons at the base of the latter and in that the corresponding envelopping centering bearing surfaces of the flanges are positioned in line with the grooves receiving said tenons.

3. Joint according to claim 1, wherein the centering end pieces of the blocks situated at the base of the tenons overlap each side of the latter, so as to increase the extent of the contact surfaces between said end pieces and the corresponding centering bearing surfaces of the associated flanges.

4. Joint according to claim 2, wherein the centering end pieces of the blocks situated at the base of the tenons overlap each side of the latter, so as to increase the extent of the contact surfaces between said end pieces and the corresponding centering bearing surfaces of the associated flanges.

5. Joint according to claim 1, wherein the centering bearing surfaces in contact are cylindrical.

6. Joint according to claim 2, wherein the centering bearing surfaces in contact are cylindrical.

7. Joint according to claim 3, wherein the centering bearing surfaces in contact are cylindrical.

8. Joint according to claim 4, wherein the centering bearing surfaces in contact are cylindrical.

9. Joint according to claim 1, wherein the centering bearing surfaces in contact are conical.

10. Joint according to claim 2, wherein the centering bearing surfaces in contact are conical.

* * * * *